(12) United States Patent
Deboard et al.

(10) Patent No.: US 11,471,879 B2
(45) Date of Patent: Oct. 18, 2022

(54) VOLUME DATA REPRESENTATION AND PROCESSING FOR LIQUID DISPENSING DEVICES

(71) Applicant: Funai Electric Co., Ltd., Osaka (JP)

(72) Inventors: Bruce A Deboard, Georgetown, KY (US); Brian T. Jones, Lexington, KY (US); Michael A. Marra, III, Lexington, KY (US)

(73) Assignee: Funai Electric Co., Ltd.

( * ) Notice: Subject to any disclaimer, the term of this patent is extended or adjusted under 35 U.S.C. 154(b) by 447 days.

(21) Appl. No.: 16/668,239

(22) Filed: Oct. 30, 2019

(65) Prior Publication Data

US 2020/0215532 A1    Jul. 9, 2020

Related U.S. Application Data

(60) Provisional application No. 62/788,290, filed on Jan. 4, 2019.

(51) Int. Cl.
*B01L 3/00* (2006.01)
*B01L 3/02* (2006.01)
*G01N 1/28* (2006.01)
*G01N 35/00* (2006.01)

(52) U.S. Cl.
CPC ........... *B01L 3/0265* (2013.01); *B01L 3/0203* (2013.01); *B01L 3/0268* (2013.01); *G01N 1/2813* (2013.01); *G01N 35/00029* (2013.01); *G01N 2001/2826* (2013.01); *G01N 2035/00039* (2013.01); *G01N 2035/00138* (2013.01)

(58) Field of Classification Search
None
See application file for complete search history.

(56) References Cited

U.S. PATENT DOCUMENTS

| | | |
|---|---|---|
| 6,001,309 A | 12/1999 | Gamble et al. |
| 6,547,358 B1 | 4/2003 | Tanaka et al. |
| 6,604,806 B1 | 8/2003 | Yamada et al. |
| 6,627,157 B1 | 9/2003 | Doktycz et al. |
| 7,135,146 B2 | 11/2006 | Johnson et al. |
| 7,199,809 B1 | 4/2007 | Lacy et al. |
| 7,401,879 B2 | 7/2008 | Isono et al. |
| 7,568,779 B2 | 8/2009 | Soma |
| 7,909,424 B2 | 3/2011 | Giri et al. |

(Continued)

FOREIGN PATENT DOCUMENTS

JP    2008151594 A    7/2008

OTHER PUBLICATIONS

Anonymous: "HP D300 Digital Dispenser Operating Manual," Operating Manual, Hewlett-Packerd Company, Oregon, vol. Edition C, Feb. 29, 2012, pp. 1-74.

*Primary Examiner* — Jyoti Nagpaul
(74) *Attorney, Agent, or Firm* — Luedeka Neely Group, PC

(57) ABSTRACT

A system and method for ejecting one or more fluids from a digital dispense device. The method includes a) inputting to a memory a volume per unit area for each of the one or more fluids to be ejected from the digital dispense device; b) matching the volume per unit area to a device resolution for the digital dispense device; c) formatting fluid ejectors for the digital dispense device for the device resolution; and d) ejecting fluid from the digital dispense device to provide the volume per area for each of the one or more fluids.

9 Claims, 9 Drawing Sheets

(56) References Cited

U.S. PATENT DOCUMENTS

| | | |
|---|---|---|
| 8,201,913 B2 | 6/2012 | Govyadinov et al. |
| 8,210,633 B2 | 7/2012 | Suzuki |
| 8,540,332 B2 | 9/2013 | Shibata |
| 8,807,676 B2 | 8/2014 | Yoshida |
| 8,959,448 B2 | 2/2015 | Cappione et al. |
| 9,075,034 B2 | 7/2015 | Glauser et al. |
| 9,199,463 B2 | 12/2015 | Nishikawa |
| 9,224,952 B2 | 12/2015 | Harjee et al. |
| 10,139,319 B2 | 11/2018 | Kubota et al. |
| 2003/0026737 A1 | 2/2003 | Inoue |
| 2004/0141041 A1* | 7/2004 | Tsutsumi ............... B41J 2/2056 347/102 |
| 2005/0238544 A1 | 10/2005 | Briscoe et al. |
| 2006/0057710 A1 | 3/2006 | Ishiura et al. |
| 2007/0056351 A1 | 3/2007 | Curtis et al. |
| 2007/0185657 A1 | 8/2007 | Lacy et al. |
| 2008/0305969 A1 | 12/2008 | Dijksman et al. |
| 2009/0033692 A1 | 2/2009 | Giri et al. |
| 2009/0117620 A1 | 5/2009 | Fritchie et al. |
| 2010/0266794 A1 | 10/2010 | Wright et al. |
| 2013/0105042 A1 | 5/2013 | Brown et al. |
| 2015/0210075 A1 | 7/2015 | Nishikawa |
| 2016/0238623 A1 | 8/2016 | Sun et al. |
| 2018/0272345 A1 | 9/2018 | Higuchi et al. |
| 2018/0272770 A1 | 9/2018 | Tobita |
| 2019/0212350 A1 | 7/2019 | Wolton |
| 2021/0165007 A1 | 6/2021 | Nielsen et al. |

* cited by examiner

VOLUME DATA REPRESENTATION AND PROCESSING FOR LIQUID DISPENSING DEVICES

RELATED APPLICATION

This application claims priority to provisional application Ser. No. 62/788,290, filed Jan. 4, 2019, and is related to U.S. application Ser. No. 16/426,137, filed May 30, 2019.

TECHNICAL FIELD

The disclosure is directed to devices and methods that are used to accurately dispense one or more fluids onto or into precise areas of a substrate for performing analysis of samples confined to the precise areas of the substrate or for building up layers of material in predetermined areas on the substrate.

BACKGROUND AND SUMMARY

A device such as an inkjet device, can dispense very small droplets of ink, usually measured in picoliters onto a substrate. For inkjet printing applications, the volume of ink that is deposited is a relatively low amount, and the volume is not as important as other factors such as color matching and print quality. The number of droplets is not specified or controlled by the user and thus the user has no ability to specify the dispensing of more ink droplets or fewer ink droplets than required for a specific printing application. A typical inkjet printer is limited to the deposition of about 2 to about 3 $\mu L/cm^2$.

However, for other applications that require accurate amounts of liquid to be dispensed onto or into a medium, fluid volume may be an extremely important and/or critical factor. For some application, it may be advantageous to specify that a volume of fluid is deposited into or over a specific area. An example may be the dispensing of a single drop of fluid containing a single cell into a well of a well-plate. Another example may be dispensing a large number of fluid droplets into a small areas such as filling each of 384 wells in a well-plate. Accordingly, the density of fluid deposited into the wells of a well-plate may require the dispensing of more than 250 $\mu L/cm^2$ of fluid. Likewise, depositing fluid onto a glass slide for analyzing a sample on the glass slide requires that a closely controlled amount of fluid is deposited over a specific area of the glass slide.

In the medical field, in particular, there is a need for automated sample preparation and analysis. The analysis may be colorimetric analysis or require the staining of samples to better observe the samples under a microscope. Such analysis may include drug sample analysis, blood sample analysis and the like. In the analysis of blood, for example, blood is analyzed to provide a number of different factors that are used to determine the health of an individual. When there are a large number of patients that require blood sample analysis, the procedures may be extremely time consuming. Also, there is a need for accurate preparation of the samples so that the results can be relied on. There are many other situations that require sample analysis in the medical field and in other fields that can benefit from the use of analytical instruments that provide accurate and reproduceable results, such as micro-titration of multiple samples.

Well plates, slides and other substrates are used for many experiments and laboratory procedures. The process of filling the wells or spotting is often performed manually or using expensive lab equipment. In some cases, the wells are filled with hand operated pipettes. In other cased, high-end automated devices based on pipette technology are used to fill the well plates. Such automated devices accommodate an open well dispense head only. The open well dispense head is a dispense head where a small amount of fluid must be deposited into an opening in the dispense head before use. The fluid is typically deposited manually using a pipette or similar means. The dispense head is held stationary while moving the microplate in both X and Y directions. These high end devices are extremely expensive.

In the areas of micro-circuit manufacture, fluids are required to be dispensed in precise locations to provide circuit devices on a substrate. The volume of fluid dispensed per unit area is typically much greater than can be provided by conventional ink jet printing technology. In some cases, different fluids are combined together on the substrate to provide a chemical or physical change to the fluids so that the resulting material performs a desired circuit function.

Other areas of micro-manufacturing may also require the precise deposit of fluids into or onto a substrate. There is thus the need for a method and device that can be used to program, dispense and visualize the deposition of a predetermine volume of one or more fluids per unit area of a substrate.

Accordingly, an embodiment of the disclosure provides a system and method for ejecting one or more fluids from a digital dispense device. The method includes a) inputting to a memory a volume per unit area for each of the one or more fluids to be ejected from the digital dispense device; b) matching the volume per unit area to a device resolution for the digital dispense device; c) formatting fluid ejectors for the digital dispense device for the device resolution; and d) ejecting fluid from the digital dispense device to provide the volume per area for each of the one or more fluid.

Another embodiment of the disclosure provides a fluid dispense system. The fluid dispense system includes A) a digital dispense device for ejecting one or more first fluids from a digital dispense device; B) an input for inputting to a memory of a computer a volume per unit area for each of the one or more first fluids; C) a translation device for matching the volume per unit area to a device resolution for the digital dispense device; D) a processor for formatting fluid ejectors for the digital dispense device according to the device resolution of the digital dispense device; and E) a first fluid cartridge containing fluid ejectors for ejecting one or more first fluids from the digital dispense device to provide the volume per area for each of the one or more first fluids.

In one embodiment, the volume per unit area is greater than the device resolution for the digital dispense device. In another embodiment, the volume per unit area is less than the device resolution for the digital dispense device.

In some embodiments, a separator is input after step (d) and steps (a)-(d) are repeated.

In some embodiments, the separator is a wait period of time between fluid depositions.

In other embodiments, the separator is a fluid cartridge change between fluid depositions.

In some embodiments, the separator is a physical property feedback loop to a user between fluid depositions.

In other embodiments, the separator is a chemical property feedback loop to a user between fluid depositions.

In some embodiments, step (e) is repeated for one or more fluids up to an including forty different fluids.

In some embodiments, the fluid dispense device includes a second fluid cartridge containing fluid ejectors for ejecting one or more second fluids from the digital dispense device.

In some embodiments, the fluid dispense device includes a display for illustrating a location and volume per unit area for each of the one of more fluids ejected by the fluid cartridge.

The system and method described herein may be used to visualize the deposition of one or more fluids into or onto a substrate so that a precise amount of the one or more fluids is dispense in a predetermined area of the substrate. Thus, the system and method may be used for performing analysis of samples and for micro-manufacturing of electrical and other devices.

The system and method provides a means to accurately dispense a specified volume of fluid over a specified area, including a method of representing volume data in an image-like format that is scalable to any number of data channels representing potentially different fluids. In addition, the method is scalable to any number of layers of data, with each layer separated by a separator. The data may be processed in a way to allow a printer or potentially other liquid dispensing devices to accurately dispense fluids onto or into a medium.

DETAILED DESCRIPTION OF EMBODIMENTS OF THE DISCLOSURE

Figure 1:
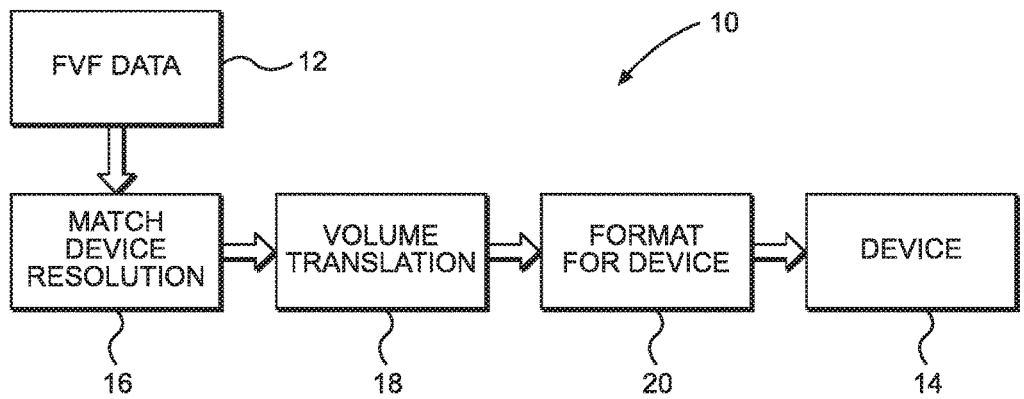
FIG. 1 is a flow diagram for processing data to be used by a digital dispense device.
Figure 2:
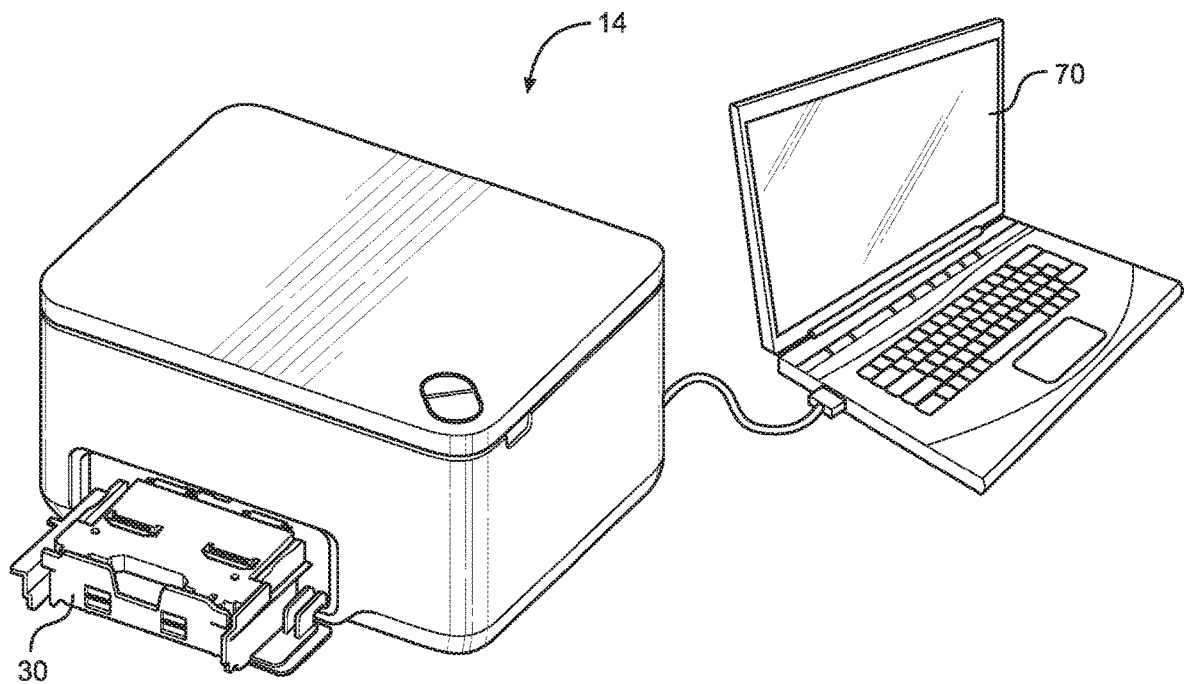
FIG. 2 is a perspective view of a digital dispense device and user interface therefor.
Figure 3:
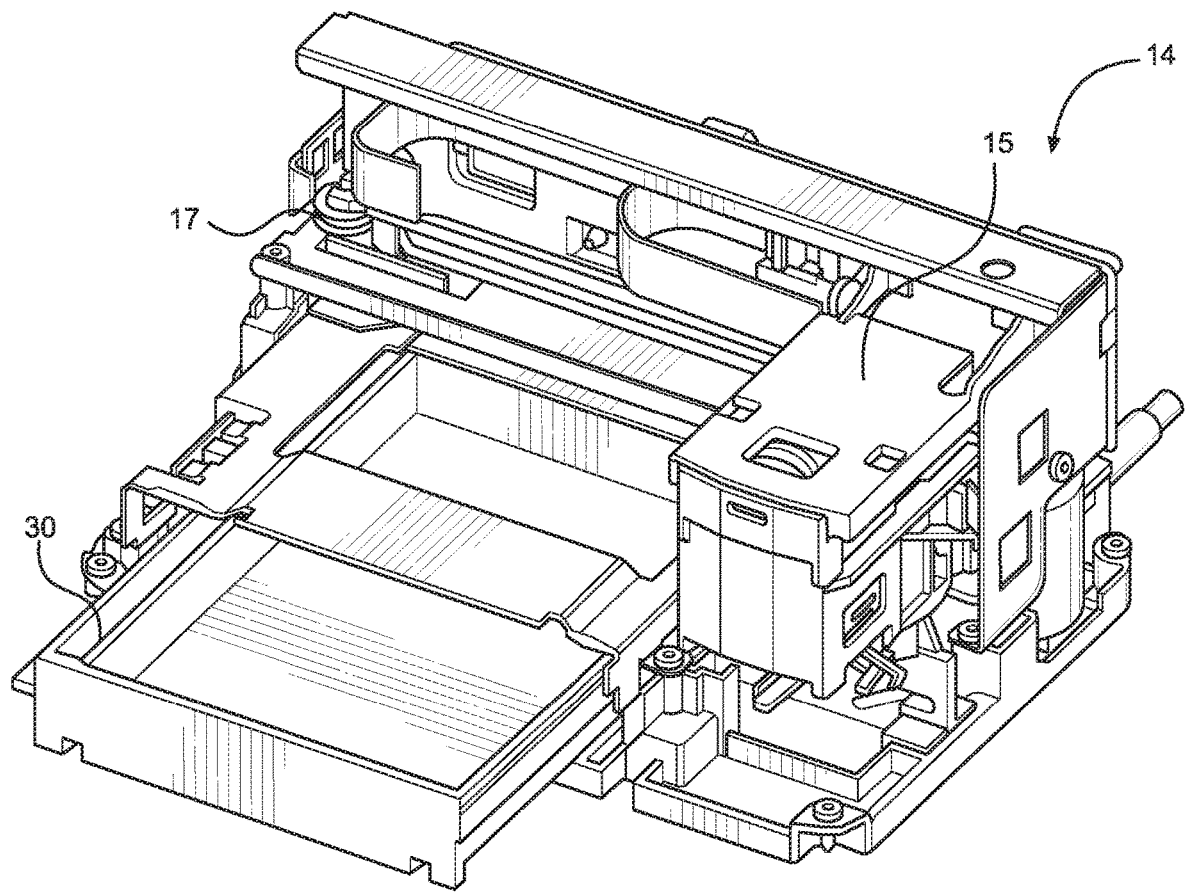
FIG. 3, is a cut-away, perspective view of the digital dispense device of FIG. 2.

In contrast to convention inkjet printing devices, the disclosed embodiments provide a unique data format appropriate for defining the volume/area required for controlling the dispensing of predetermined amounts of fluid. The data format described here is referred to as "FVF format" and includes "FVF data." The data for the FVF format is processed in a way specific to a fluid dispensing device to accurately dispense a specified volume of fluid into the specified area. FIG. 1 shows an overall process flow 10 for the FVF format. In order to encode the FVF data 12 for use by a digital dispense device 14 (FIGS. 2-3), a data format that is similar to existing image formats such as a raster may be used. A cut-away view of the digital dispense device 14 is illustrated in FIG. 3 and includes a removable cartridge 15, and a translation device 17 for moving the cartridge in an x direction across a tray 30. The cartridge 15 may include a single fluid or multiple fluids and an ejection head for depositing fluids on a substrate. The cartridge 15 may be removed and a new or different cartridge installed in the digital dispense device 14 for deposition of one or more different fluids onto a substrate.

Traditional image formats specify the color desired at a specific x,y location on a substrate. Accordingly, the tray 30 may move the substrate in a y direction while the cartridge traverses the substrate in an x direction. The traditional image formats are also often interleaved, which limits the number of channels that can be described. By contrast the FVF format describes each channel as a separate plane and supports any number of planes. Accordingly, any number of fluid channels may be described in one data set so it is easiest to describe each channel's data separately rather than interleaving the channel data.

Figure 4:
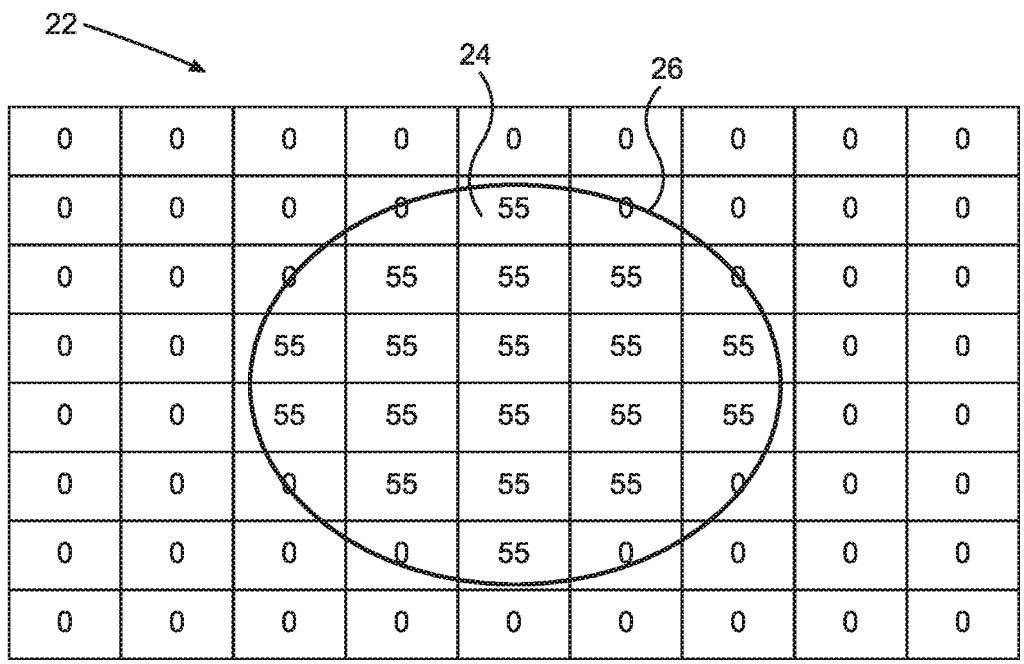
FIGS. 4-5 are graphical representations of fluid droplets disposed in a pixel location.

As a simple illustration, the FVF data may define an array 22 of pixels 24 as shown in FIG. 4, where the numbers in the array 22 of pixels 24 indicates the number of drops that are dispensed to a specific pixel location 26. A value of 0 signifies 0 drops, 1 signifies 1 drop, 2 signifies 2 drops, and so on. The FVF format also enables defining many channels or fluids independently without a limitation on the number of planes defined, as well as allowing for a means to specify layers of dispensed fluid combinations.

As shown in the array 22, a pixel location 26 is specified that contains 18 pixels 24. Assuming that a desired total volume of the pixel location 26 is 10,000 pL and the device 14 ejects a drop size of 10 pL, the number of drops per pixel 24 can be calculated as follows: 10,000 pL/(10 pL/drop)/18 pixels=55.56 drops/pixel, as shown in FIG. 4.

Figure 5:
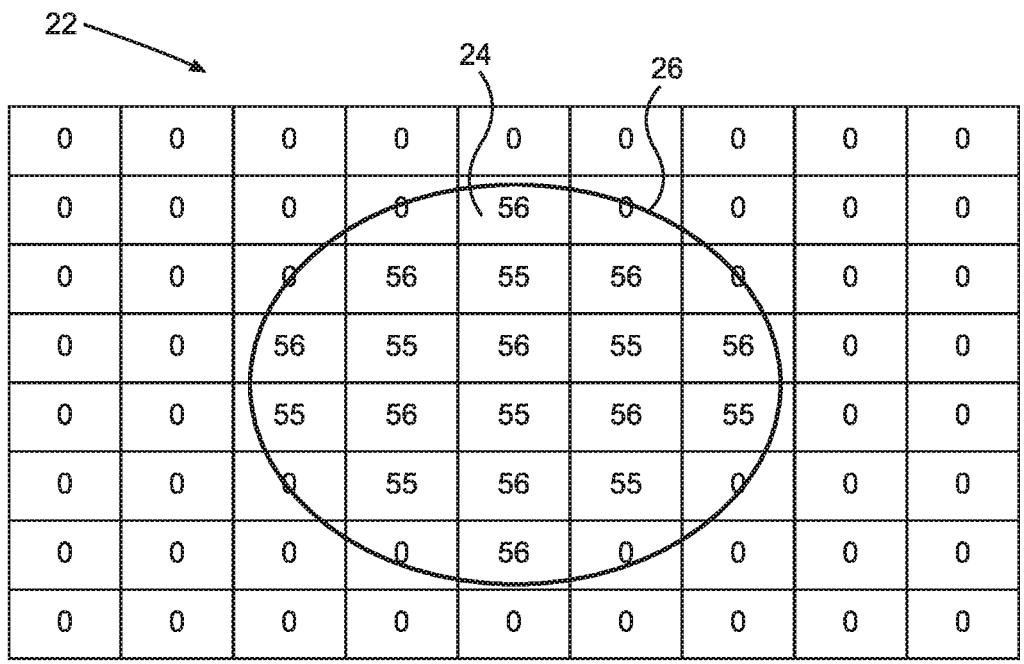

The foregoing example results in a total error of 0.56 drops per pixel, or a total of 10.08 drops. The remainder of drops may be spread easily over the target pixel location 26 of 18 pixels using a variety of techniques. One such result is shown FIG. 5, where 1 drop is added to the amount in 10 pixels 24. Accordingly, the FVF data format for pixel location 26 has an accuracy of within less than 1 drop size of the digital dispense device 14.

Figure 6:
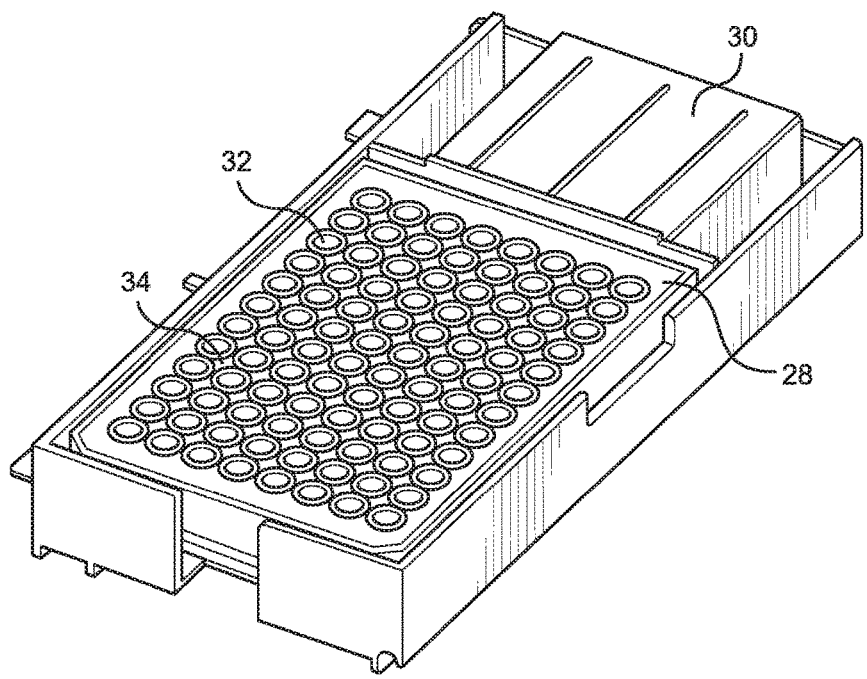
FIG. 6 is a perspective view of a micro well plate on a tray for accepting fluids from the digital dispense device of FIG. 2.

As a second, more specific illustration, consider volumes and resolutions common to micro-well plate dispensing of fluids. A conventional micro-well plate 28 disposed in a tray 30 for the digital dispense device is illustrated in FIG. 6. The fluid volume required for micro-well plate fluid dispensing applications is typically many times the volume required for inkjet printing applications. For example, a 96 well micro-well plate has accurately sized wells 32 that are usually circular. If it is desired to dispense into the well 32 of a micro-well plate 28 using a circular area with a diameter of 4 mm, then the total area of the well 32 is 12.57 mm². In order to convert the well plate area to pixels, a resolution for the pixel data must be determined. A typical inkjet resolution is 300 dpi (dots per inch). Using 300 dpi as the device resolution, we get 1 mm=11.81 300 ths. Based on the 300 dpi resolution, the area calculation for a 4 mm diameter well 32 is as follows:

$$\text{Radius}=2 \text{ mm}=11.81*2=23.62 \text{ 300 ths.}$$

$$\text{Area}=3.1415*(23.62)^2=1752.65 \text{ pixels at 300 dpi}$$

There is no such thing as a fractional pixel, so the result is rounded down 1752 pixels.

Next the pixel values of those 1752 pixels is determined. For this example the following assumption is made:

Desired Volume=1 uL=1,000,000 pL
Drop volume=10 pL

In general, "Desired Volume" is a parameter of the application, and "Drop Volume" is a property of a fluid ejection cartridge used to dispense the fluid.

In order to place 1 uL in a 4 mm diameter well 32 using 10 pL drops, the following calculation is made: 1,000,000/10=100,000 drops.

Assuming a uniform coverage over the selected area is desired, the 100,000 drops is spread over the pixel area as follows: 100,000/1752 pixels=57.08 drops per pixel, rounded down to 57 drops per pixel. So each pixel in the 1752 pixel area would have a value of 57 drops per pixel. The foregoing assumes that an error −0.08 drops per pixel is acceptable, however, there are ways to offset the error.

In order to place circular areas in the correct locations on the well plate 28, pixel values of 0 are used to signify empty space 34 between wells 32. Using this method, a raster format is constructed that can specify droplet volumes and locations.

If it is desired to reduce the error associated with 57.08 drops per pixel being rounded down to 57 drops per pixel, a slightly more complex algorithm to generate the FVF data can be used. In order to appreciate the use of the more complex algorithm, the error is first calculated for truncating 57.08 drops per pixel to 57 drops per pixel as follows:

57.08 drops per pixel*1752 pixels=100004.16 drops 57 drops per pixel*1752 pixels=99864 drops The difference is 140 drops, which is not a large number. However, in some applications 140 drops can important, and in other examples the error could be 0.49 rather than 0.08, which would result in a much larger error.

Instead of setting every one of the 1752 pixels to 57 drops per pixel, a method that accumulates the rounding error may be used to give a more accurate dispense volume. According to the method, the drops per pixel are truncated rather than rounded, so that 57.08 drops per pixel becomes 57 drops per pixel, and 57.99 drops per pixel also becomes 57 drops per pixel. Each pixel is calculated as follows:

Real Pixel Value=Real Pixel Value+Accumulated Error

PixelValue=truncate(Real Pixel Value)

Accumulated Error=(Real Pixel Value−PixelValue)

In this way, the error is accumulated and eventually enough will be accumulated so that the truncated value will become 58 instead of 57, according to the above example. The foregoing method may be able to reduce the error to within one drop volume.

FVF data in the examples above has been described as one byte per pixel, but the FVF data does not have to be limited to one byte per pixel. The FVF format itself allows that any number of bytes may be used to describe a pixel, although in practice a maximum value of four bytes per pixel would likely be the largest value that is used.

Each set of FVF data may consist of a header and associated data, with the header describing various aspects of the data, including, but not limited to:

1. Data width
2. Data height
3. Bytes per pixel
4. Number of data channels
5. Horizontal pixel resolution
6. Vertical pixel resolution
7. Original Base Volume
8. Maximum Value
9. Volume Multiplier
10. MaxFrequency wherein, the "Original Base Volume" is defined as the value in pL that was used to create the file which is usually the drop volume. The Original Base Volume is used to translate between differing drop volumes. The "Maximum Value" is defined as the maximum pixel value found in the pixel data. The "Volume Multiplier" is defined as the value that is applied to each pixel as a multiplier, which can be used to represent higher volumes in lower byte per pixel data, potentially at the expense of some dispense volume accuracy. The "MaxFrequency" is defined as the value that specifies the maximum frequency that the data can be dispensed at which may affect the top speed of the digital dispense device 14.

In addition to the above aspects of the FVF data in the header, there may be application specific values included in the header data that only certain applications will use and other applications will ignore. For example, many inkjet printers use a level of dithering, sometimes called shingling, to effectively spread the data in order to prevent certain fluid ejection defects that may occur. A header value for SHINGLELEVEL may communicate to digital dispense device 14 information on how to dispense the data while a different device may ignore such header value for SHINGLELEVEL.

Figure 7:
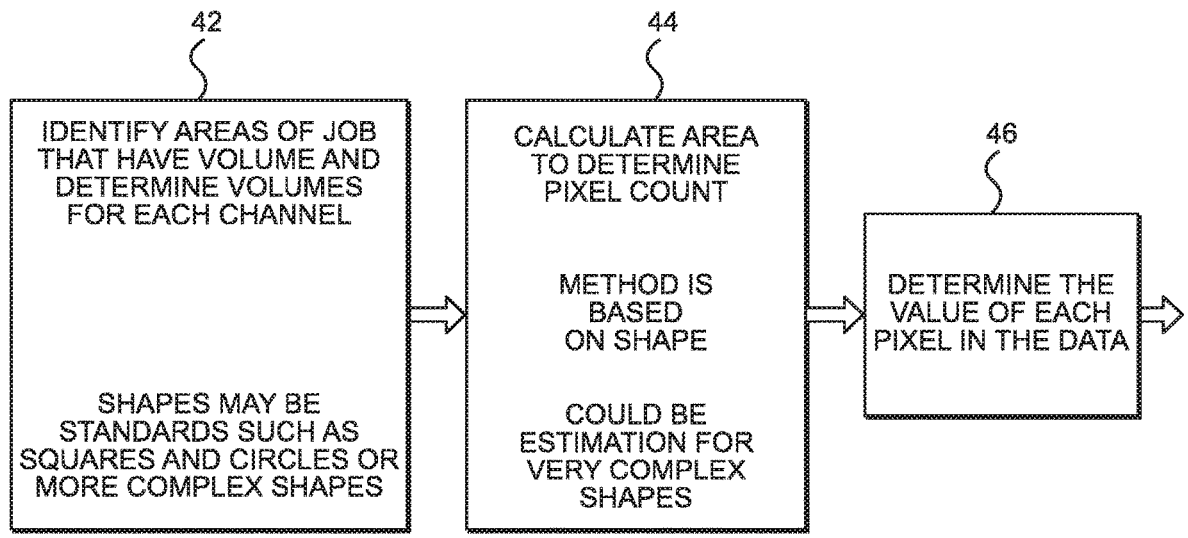
FIG. 7 is a flowchart for creating FVF data for the digital dispense device of FIG. 2.

FIG. 7 is a flowchart 40 for creating FVF data. In the first step 42 of the process, areas of a "Job" that have volumes are identified and the volume per area for each channel are determined. The shapes for the volumes may include standard shapes such as squares, circles, triangles, ovals, and the like, or more complex shapes. A user can draw the shapes with a graphics program and thus can specify any desired shape and the volume per pixel that is dispensed in the specified area. Thus, an area may have different shapes and different volumes per pixel.

In the next step 44 of the process, the area is calculated in order to determine the pixel count for the specified area. The method that is used for determining the pixel count is dependent on the shape of the area. For very complex shapes, the calculation method may be an estimation of the pixel count rather than an actual pixel count. Finally, in step 46, the value for each pixel in the FVF data is determined. The foregoing process is repeated for each fluid or channel required by the particular fluid dispense application.

The foregoing FVF data description may be considered as the dispensing of fluid in a single layer if the concept is extended to a three dimensional fluid dispense application, even if the third dimension is time instead of a Z-axis. The concept of a fluid layer may be useful for many different applications. Each fluid layer may be separated by a layer separator from an adjacent layer for a variety of reasons, and the parameters of each fluid layer may be different for different applications.

In some applications, the layer separator may be a period of time that is needed to dry the dispensed fluid, time to mix dispensed fluids properly, or time to complete a chemical reaction. In other applications, the layer separator may be a prompt for change to a second fluid cartridge when a second fluid is required to be dispensed after a first fluid from a first cartridge. In some applications, each cartridge may dispense 2 or more fluids, such as four fluids.

Figure 8:
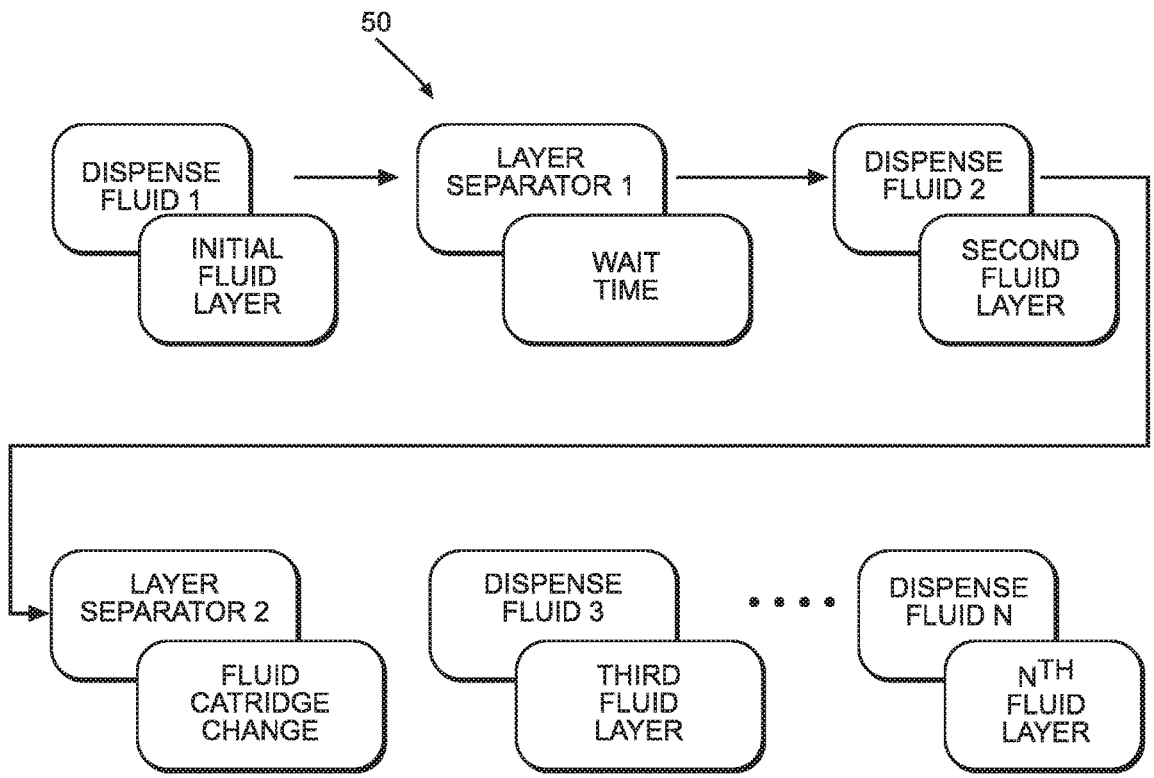
FIG. 8 is a simplified flow diagram for dispensing layers of fluid onto a substrate using the digital dispense device of FIG. 2.
Figure 9:
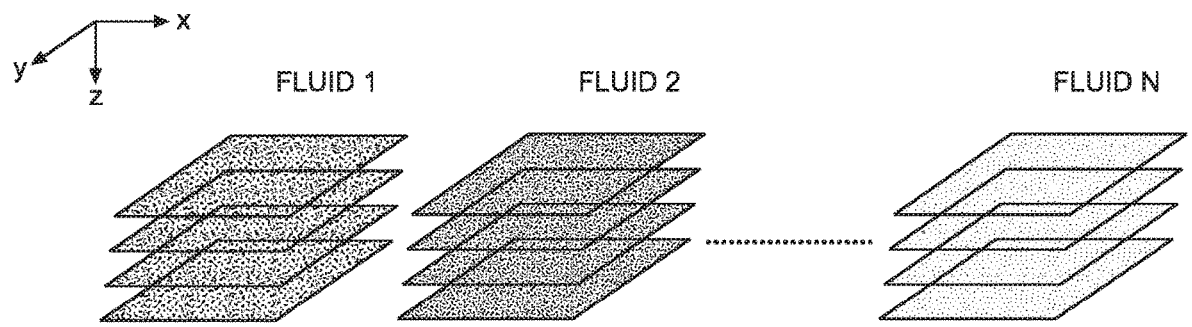
FIG. 9 is a graphical representation of fluid layers deposited on a substrate by the digital dispense device of FIG. 2 for fluids 1 to N.

In other applications, the layer separator may be an external signal supplied by an external device that measures some property of the layer such as temperature, hardness, pH, density, or other physical property change that may occur before the next fluid layer is dispensed. The layer separator may be an external device that manipulates the substrate or layer in some way, either by moving it or by supplying another step of the fluid dispense job such as putting a lattice in place, providing heat or light to dry or cure the fluid, or other operations that do not include dispensing additional fluids. In still other applications, the layer separator may be a wait period of time between fluid layer dispensing. There is no particular limit to the number of layers and layer separators that may be used according to the disclosure. FIG. 8 illustrates a simplified flow diagram 50 of dispensing layers of fluids with layer separators between fluid dispense steps. The fluid layers that are dispense in a particular area are illustrated schematically in FIG. 9 for fluids 1 to N dispensed by a digital dispense device 14.

As set forth above, the method according to the disclosure formats FVF data for a digital dispense 14 where the input is a volume of fluid to be deliver over a defined area. The input data that is created by the foregoing calculations is effectively an image representing both X and Y axes, but also introduces a Z axis that represents volume as shown schematically in FIG. 9. In addition, when dispensing more than 1 channel or fluid at once, a 4th dimension is introduced to track the different channels or fluids.

The foregoing method provides benefits over traditional digital dispense systems which may print the entire volume of fluid into a micro-plate well in a single operation. The foregoing method may be used to spread the volume of fluid to be dispensed over multiple dispense head passes and multiple fluid ejectors along a dispense head array of an ejection head. This will minimize the impact of missing or poorly performing fluid ejectors. Depending on the desired dispense accuracy and probability of ejectors not functioning correctly, a minimum number of fluid ejectors to use can be specified or calculated.

Figure 10:
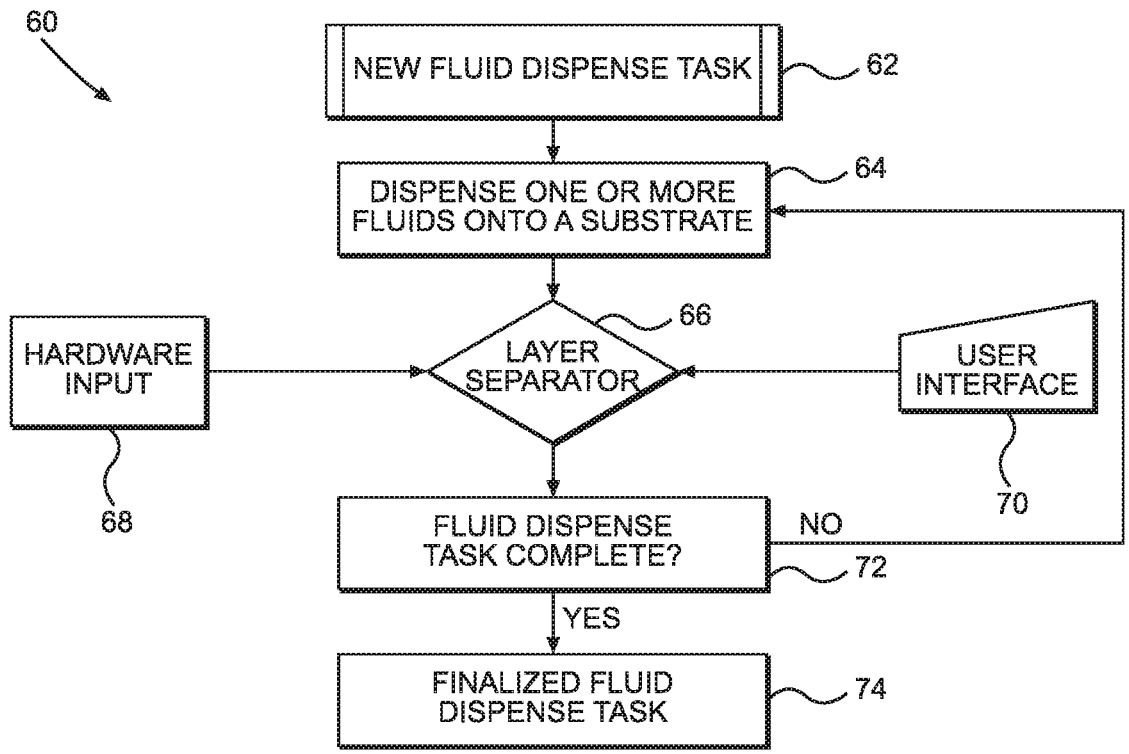
FIG. 10 is a process flow diagram for dispensing fluids onto a substrate according to a software program for processing data for the digital dispense device of FIG. 2.
Figure 11:
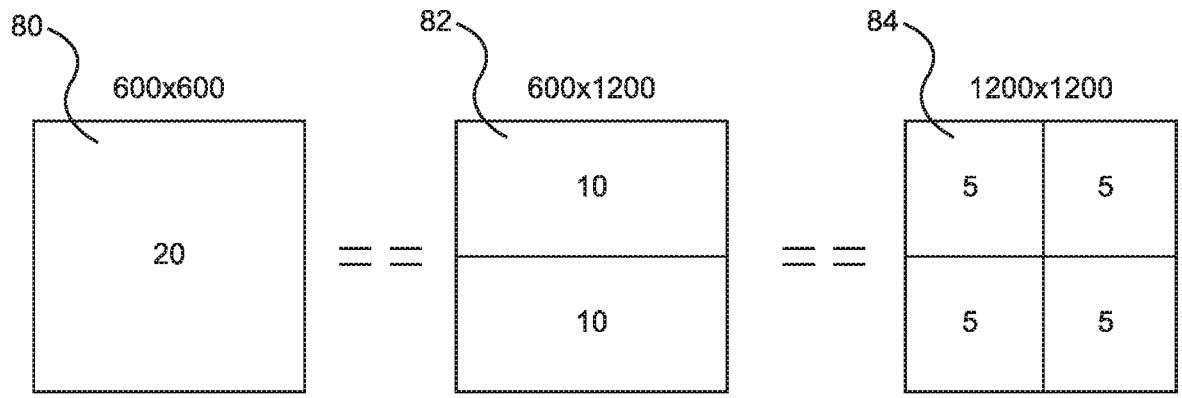
FIGS. 11-14 are graphical representations of how total volumes are divided for fluid deposition according to various digital dispense device resolutions.

FIG. 10 illustrates a process flow diagram 60 implemented by a software program that resides in the memory of a computer or in a memory of the digital dispense device 14 for sequencing the dispensing of multiple fluids by the digital dispense device 14 in order to complete a specific fluid dispensing task. According to the process flow diagram 60, a fluid dispense task is identified in the software in step 62. Once identified, one or more fluids may be dispensed simultaneously or sequentially onto a substrate in step 64. If a reaction is required to take place, a layer separator 66 provides a built in wait time, a hardware input 68, such as a color change, temperature change, density change, or other fluid property input, and/or a user input from a user interface 70 that can vary widely depending on the fluids being used and the particular fluid dispense task being performed. The user inputs may be selected from a fluid cartridge change, a fluid selection change, a fluid volume change, visual inspection, or other user input as required by the fluid dispense task. In step 72, a decision is then made by the software program to continue to dispense fluids to complete the fluid dispense task, or to finalize the fluid dispense task in step 74.

Accordingly, the dispense system procedure described in FIG. 10 may be used to create automated jobs, and/or the analysis steps that require human input can be scripted and displayed by the system to reduce errors in the fluid dispense task procedures.

The FVF data may be generic and for the most part not specific for a digital dispense device 14. However, at an application level, the unique characteristics of the digital dispense device 14 may come into play. It is likely that a specific device or application will have a very narrow range of fluid dispense jobs that it can perform. For example, the digital dispense device may only print on or dispense fluids into micro-well plates or onto slides. Also, the digital dispense device may perform the fluid deposition tasks in a very specific way, such as by use of a pipette machine dispensing fluid into wells one at a time. Accordingly, the processing of the FVF data may vary from device to device.

Referring again to FIG. 1, the first step 16 processes the FVF data to match the output resolution of the digital device 14. Matching the FVF data may include an upsample or downsample in resolution, as well as a scale factor using an original base volume. For example, if the FVF data is 600×600 dpi, but the digital dispense device output is 1200×1200 dpi, then a resolution change of the FVF data is necessary. A resolution of 1200×1200 dpi means that there are twice as many pixels horizontally as the input FVF data, and twice as many pixels in the Y or vertical plane as the input FVF data. One 600×600 dpi pixel can contain four 1200×1200 dpi pixels in the same area. If the total volume of fluid in a layer is to be held constant, the volume of fluid will have to be divided to spread the 600×600 dpi pixel over the four 1200×1200 dpi pixels.

FIGS. 11-14 illustrate how the total volume may be divided for different device output resolutions. For example, with reference to FIG. 11, if the FVF data requires the deposition of 20 drops of fluid in the 600×600 dpi pixels (pixel area 80) and the device output resolution in pixel area 82 is 600×1200, then the 20 drops are divided into so that 10 drops are dispensed in each of the 600×1200 dpi pixels in pixel area 82 and 5 drops are dispensed in each of the 1200×1200 dip pixels in pixel area 84 in order to obtain an equal volume of fluid in the specified pixel area.

Figure 12:
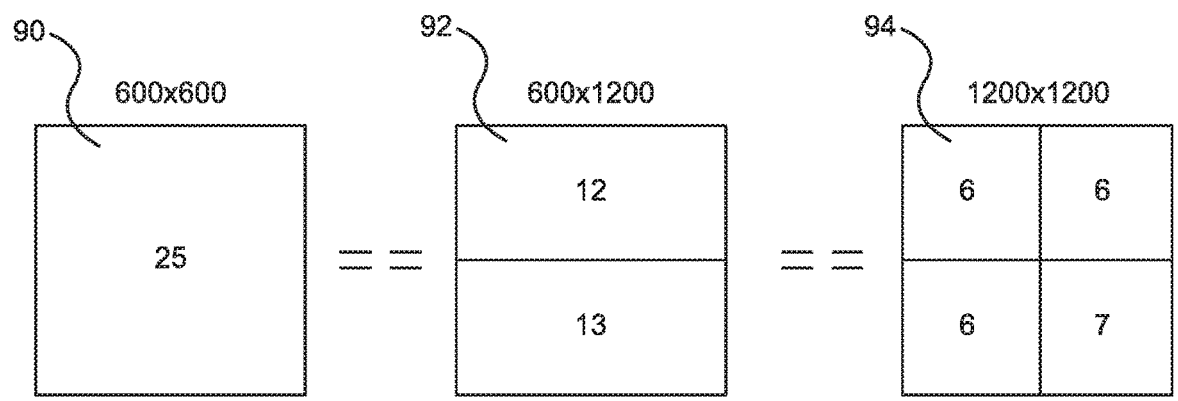

FIG. 12 illustrates an example wherein there is an odd number of fluid droplets to dispense. For example, if the FVF data requires 25 drops with a resolution of 600×600 dpi in pixel area 90, then the 600×1200 dpi pixels of pixel area 92 require 12 drops in one portion of the pixel area 92 and 13 drops in another portion of the pixel area 92 to provide the 25 drops. Likewise, the 1200×1200 dpi pixels of pixel area 94 require 6 drops in three portions of the pixel area 94 and 7 drops in one portion of the pixel area 94 in order to obtain the 25 drops.

Figure 13:
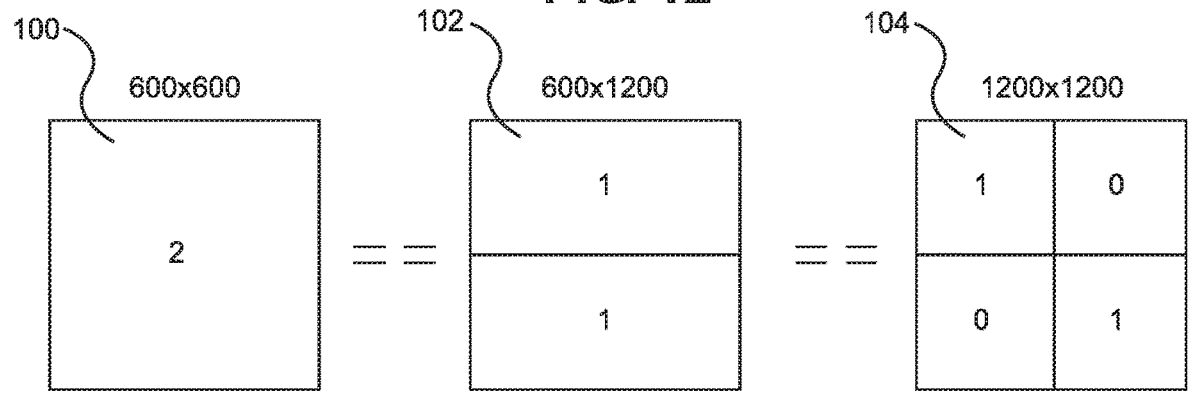

In another example shown in FIG. 13, the FVF data requires 2 drops in the pixel area 100 with a resolution of 600×600 dpi, then the 600×1200 dpi pixels requires 1 drop in each portion of the pixel area 102. However, the pixel area 104 of the 1200×1200 dpi pixels has 1 drop in two portions of the pixel area 104 and 0 drops in two other portions of the pixel area 104.

Figure 14:
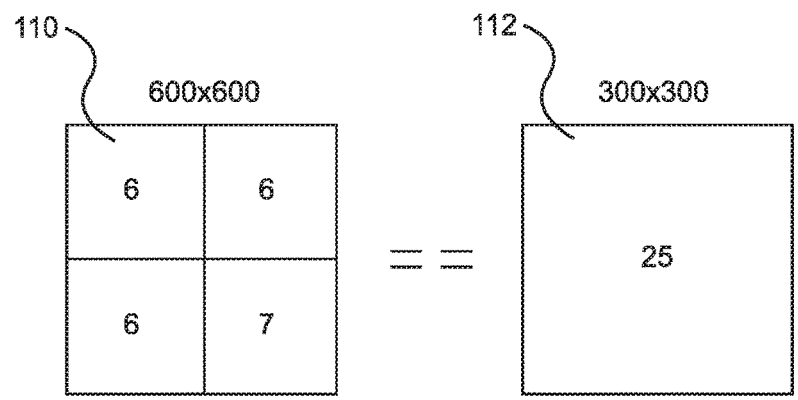

FIG. 14 illustrates a situation wherein the FVF data is at a higher resolution than the digital dispense device. In that case, the FVF data will have to be downsampled. Accordingly, if the device resolution has a 300×300 dpi output, the 600×600 dpi pixels in pixel area 110 will have to be combined into one 300×300 dpi pixel area 112 which results in a sum of the four pixels in pixel area 100 as shown.

Referring again to FIG. 1, the next step 18 of the process is to translate the volume data. Based on the original base volume from the header information, it may be necessary to translate the pixel values into droplet size for the fluid cartridges if the device droplet size does not match the original base volume. Such a situation may occur if the FVF data was generated for a different device or cartridge, or it could be the same device, and the fluid properties in the cartridge do not match the original data. Some fluids may have different drop volumes within the same cartridge. Step 18 may be done before step 16 or concurrently with step 16 in the process.

The final step 20 is to take the modified FVF data and format the FVF data into a data stream that the digital dispense device 14 recognizes. Step 20 may be done in the device 14 itself or in a host application that feeds the formatted data to the device 14. The format generated in step 20 is typical of print data for the device 14.

Some of the benefits of the disclosed embodiments, include but are not limited to:
1) an ability to precisely specify an amount of fluid to be dispensed to a particular area;
2) an ability to extend fluid deposition to any number of channels;
3) an ability to scale of the volume of fluid to handle large volumes using a base volume and volume multiplier;
4) an ability to specify a number of bytes per pixel;
5) the use of layers and layer separators between fluid dispense steps to allow for a variety of actions or wait times during a dispense process; and
6) an ability to translate data into a form that can be used by a wide variety of liquid dispensing devices to accurately dispense fluid onto or into a medium.

Figure 15:
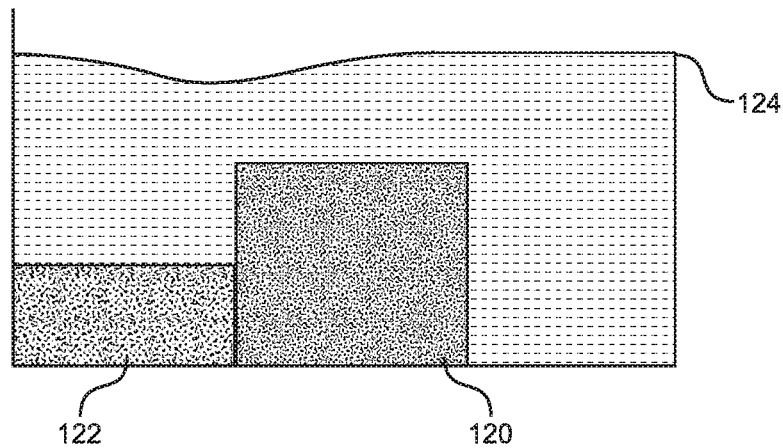
FIGS. 15-17 are graphical representations on a digital display for fluids deposited on or in particular areas of a substrate.
Figure 16:
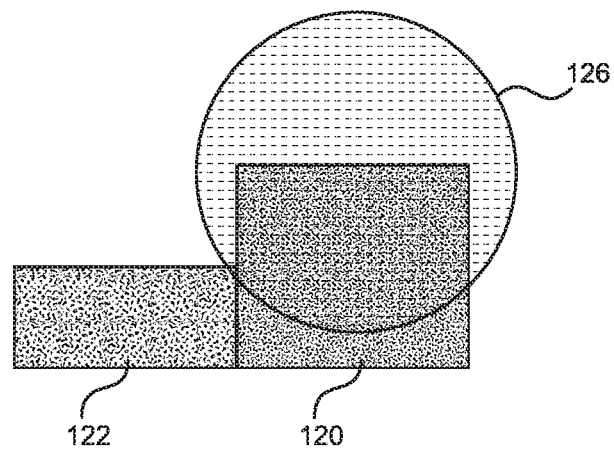
Figure 17:
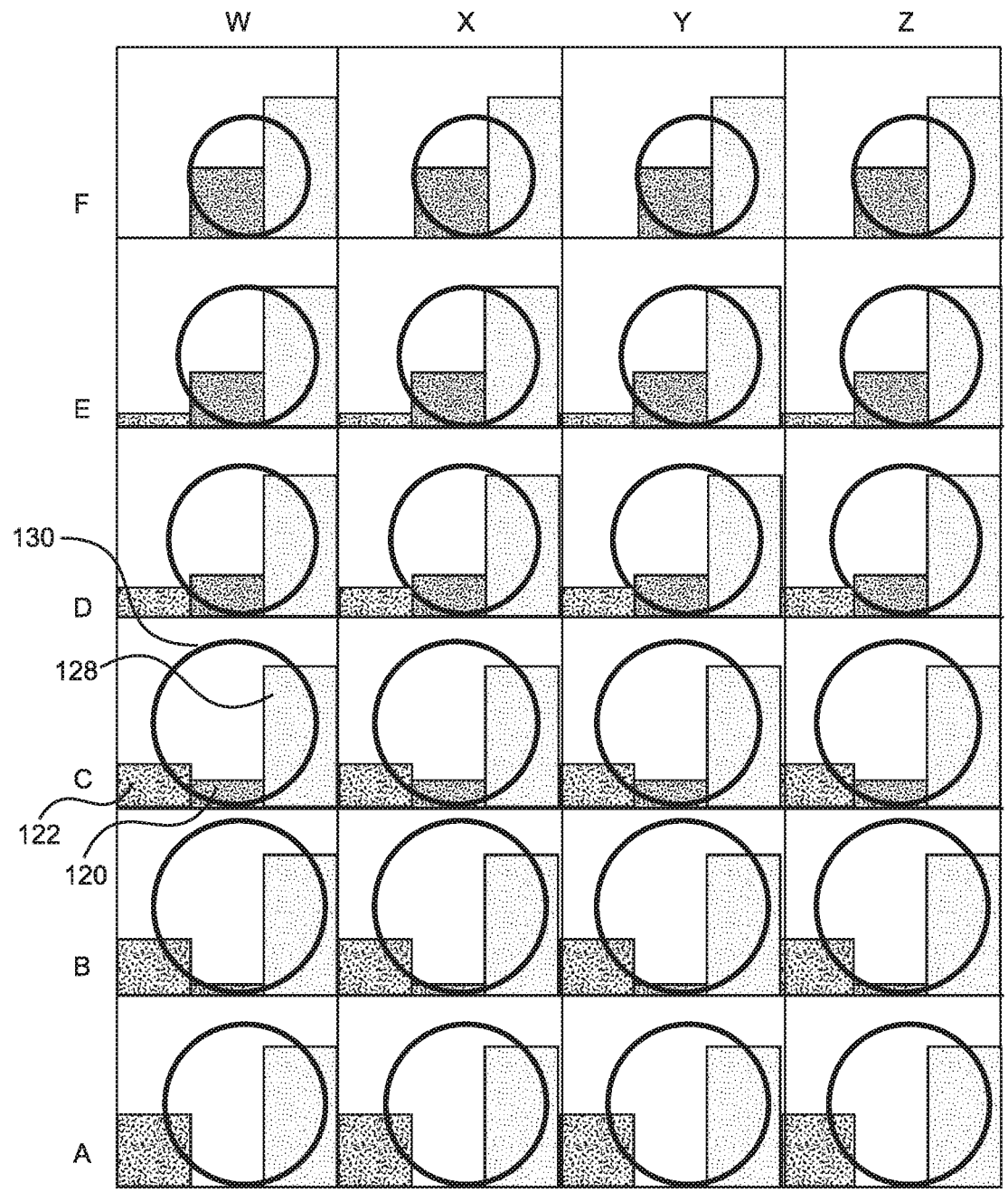

In order to visualize the fluids dispensed by the digital dispense system, the fluid volume per area information may be displayed on the user interface 70 as a graphic image as shown in FIGS. 15-17 representing both X and Y axes that represent an area and a Z axis that represents volume for fluids 1 to N. In addition, when dispensing more than 1 channel or fluid at once, a 4th dimension is introduced to track the different channels or fluids.

When dispensing fluids in applications where volume is an important input, such as medical micro-well plates 28, glass slides, or other substrates, it's important to be able to display to the user a useful visual representation of the volume of each fluid being used. Since some wells 32 can hold a significant volume, a relative volume display that uses the fluid with the highest volume as a maximum and scales the rest of the fluids to the highest volume fluid is one way to compare the fluids to each other. An absolute volume scale may not be useful for fluids in a large well since the amount of fluid may not be sufficient to provide visually useful information.

In FIG. 1, bar graphs 120 and 122 for two fluids represent a relative volumes of each fluid in a single well 32 of a well plate 28, on a glass slide, or on another substrate, while 124 represents the absolute total volume of the fluids dispensed. In FIG. 16, bar graphs 120 and 122 of two fluids again represent the relative volumes of each fluid on a slide or in a single well 32 of a well plate 28, however, an expanding circle 126 may be used to represent the total relative volume of all fluids that are dispensed into a well 32, onto a glass slide, or onto other substrates. The user interface for display on a digital display device of a user interface 70 may be configured to provide both types of visual representation shown in FIGS. 15 and 16 by selecting a desired visual representation from a drop down menu in the user interface 70. Likewise, the user interface 70 may be configured to show the absolute or relative volumes in a single well 32 or in multiple wells 32 of a well plate 28.

FIG. 17 illustrates a visual representation of the fluids in wells 32 of a well plate 28 using bar graphs 120, 122 and 128 and relative volume circles 130. The bar graph 128, representing the largest volume of fluid, is used to scale the other fluids in order to provide a good comparison of fluid volumes in each well. Only a small portion of the well plate 28 is represented by the visual display in FIG. 17 providing a visual display of the fluid in the wells in rows A-E and in columns W-Z. The amount of each fluid dispensed may vary by row, by column, or by individual cell. The digital dispense device 14 may be programmed by use of the digital display device to deposit predetermined amounts of fluids in predetermined locations of a well plate 28, glass slide or other substrate.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A method for ejecting one or more fluids from a digital dispense device, the method comprising the steps of:
    a) providing a glass slide or a micro-well plate;
    b) inputting to a memory a volume per unit area for each of the one or more fluids to be ejected from the digital dispense device onto the glass slide or into a well of the micro-well plate;
    c) matching the volume per unit area to a device resolution for the digital dispense device;
    d) formatting fluid ejectors for the digital dispense device for the device resolution; and
    e) ejecting fluid from the digital dispense device onto the glass slide or into the well of the micro-well plate to provide the volume per area for each of the one or more fluids.

2. The method of claim 1, wherein the volume per unit area is greater than the device resolution for the digital dispense device.

3. The method of claim 1, wherein the volume per unit area is less than or equal to the device resolution for the digital dispense device.

4. The method of claim 1, further comprising (f) inputting a separator after step (e) and repeating steps (a)-(e).

5. The method of claim 4, wherein the separator comprises a wait period of time between fluid depositions.

6. The method of claim 4, wherein the separator comprises a fluid cartridge change between fluid depositions.

7. The method of claim 4, wherein the separator comprises a physical property feedback loop to a user between fluid depositions.

8. The method of claim 4, wherein the separator comprises a chemical property feedback loop to a user between fluid depositions.

9. The method of claim 4, further comprising repeating step (f) for each of the one or more fluids up to and including forty different fluids.

\* \* \* \* \*